(12) United States Patent
Kim (10) Patent No.: US 7,614,225 B2
(45) Date of Patent: Nov. 10, 2009

(54) STRAIGHT TRAVELING HYDRAULIC CIRCUIT

(75) Inventor: Jin Wook Kim, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 253 days.

(21) Appl. No.: 11/732,438

(22) Filed: Apr. 3, 2007

(65) Prior Publication Data

US 2007/0240562 A1 Oct. 18, 2007

(30) Foreign Application Priority Data

Apr. 18, 2006 (KR) ........................ 10-2006-0034747
Apr. 18, 2006 (KR) ........................ 10-2006-0034748

(51) Int. Cl.
   *F15B 11/00* (2006.01)
   *B62D 11/06* (2006.01)

(52) U.S. Cl. ........................................... 60/421; 60/428

(58) Field of Classification Search .................. 60/421, 60/428, 429; 91/444
See application file for complete search history.

(56) References Cited

U.S. PATENT DOCUMENTS

| | | | | |
|---|---|---|---|---|
| 5,083,428 | A | * | 1/1992 | Kubomoto et al. ............. 60/421 |
| 5,568,727 | A | * | 10/1996 | Chung ........................... 60/421 |
| 5,680,759 | A | * | 10/1997 | Chung ........................... 60/421 |
| 6,708,490 | B2 | * | 3/2004 | Toji et al. ....................... 60/421 |

FOREIGN PATENT DOCUMENTS

| | | |
|---|---|---|
| JP | 61-142234 | 6/1986 |
| JP | 2-47434 | 2/1990 |
| JP | 4-70429 | 3/1992 |
| JP | 6-306892 | 11/1994 |
| JP | 2000-282514 | 10/2000 |

OTHER PUBLICATIONS

Patent abstracts of Japan of JP 2-47434 dated Feb. 16, 1990.
Patent abstracts of Japan of JP 61-142234 dated Jun. 30, 1986.
Patent abstracts of Japan of JP 6-306892 dated Nov. 1, 1994.
Patent abstracts of Japan of JP 2000-282514 dated Oct. 10, 2000.
Patent abstracts of Japan of JP 4-70429 dated Mar. 5, 1992.

* cited by examiner

*Primary Examiner*—Thomas E Lazo
(74) *Attorney, Agent, or Firm*—Ladas & Parry LLP

(57) ABSTRACT

A straight traveling hydraulic circuit is provided. In case of performing a combined operation in which a fine operation of a working device and a fine traveling of a traveling device are simultaneously required, the straight traveling hydraulic circuit can allow the working device and the traveling device to operate independently, and thus prevent a declination or sudden traveling of the equipment. In case of performing the combined operation by simultaneously operating the traveling device and the working device, first and second center bypass shifting valves installed on the lowermost stream side of first and second center bypass passages are shifted by a pilot signal pressure that shifts a straight traveling valve installed on an upper stream side of the second center bypass passage, so that the degree of opening of the first and second center bypass passages is reduced to operate the working device and the traveling device independently.

4 Claims, 4 Drawing Sheets

STRAIGHT TRAVELING HYDRAULIC CIRCUIT

CROSS-REFERENCE TO RELATED APPLICATION

This application is based on and claims priority from Korean Patent Application Nos. 10-2006-34747 and 10-2006-34748, filed on Apr. 18, 2006 in the Korean Intellectual Property Office, the disclosure of which is incorporated herein in its entirety by reference.

BACKGROUND OF THE INVENTION

1. Field of the Invention

The present invention relates to a straight traveling hydraulic circuit for heavy construction equipment using a plurality of hydraulic pumps, which can improve the traveling manipulability of the equipment during a combined operation in which a traveling operation and a working operation are simultaneously performed.

More particularly, the present invention relates to a straight traveling hydraulic circuit, which, in case of performing a combined operation in which a fine operation of a working device and a fine traveling of a traveling device are simultaneously required, such as burying of waste pipes under a road in a downtown, can allow heavy construction equipment to travel independent of the working device, thereby preventing a declination or sudden traveling of the equipment.

2. Description of the Prior Art

Generally, heavy construction equipment, such as excavators, are constructed to operate actuators (traveling motors) of a traveling device and actuators (boom cylinder, arm cylinder, bucket cylinder and the like) of a working device using a plurality of hydraulic pumps. In case of performing a combined operation in which a traveling operation and a working operation are simultaneously performed, a hydraulic circuit includes a straight traveling valve installed on an upstream side of one hydraulic pump. The hydraulic circuit shifts the straight traveling valve in response to an operation signal of the traveling and working devices.

Figure 1:
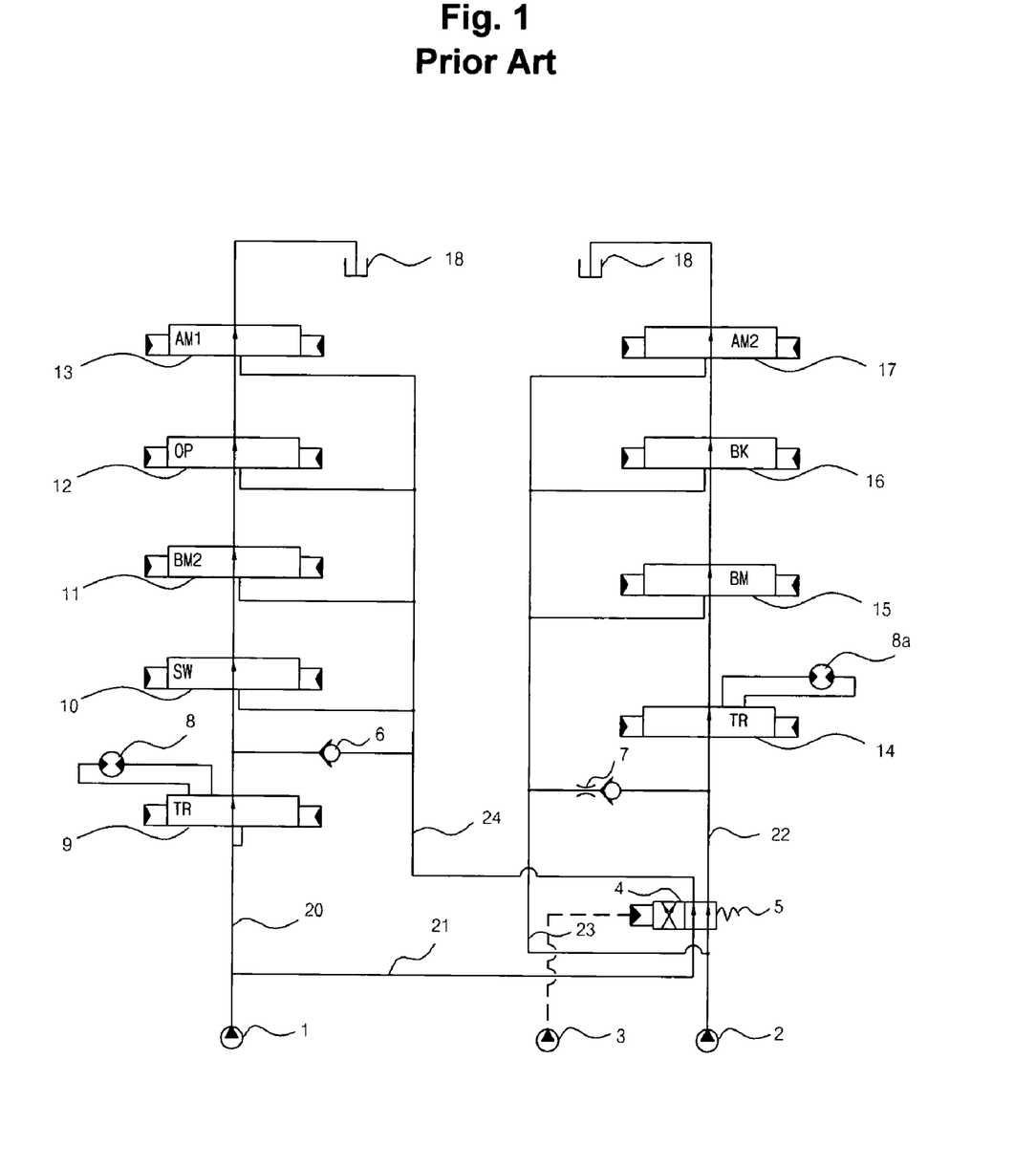
FIG. 1 is a circuit diagram of a conventional straight traveling hydraulic circuit.

Referring to FIG. 1, a conventional straight traveling hydraulic circuit includes a plurality of first and second hydraulic pumps 1 and 2, and a pilot pump 3; a first traveling control valve 9 for a left traveling motor 8 and control valves 10 to 13 for a working device (swing, boom, option device, and arm) which are installed in a first center bypass passage 20 of the first hydraulic pump 1; a second traveling control valve 14 for a right traveling motor 8a and control valves 15 to 17 for the working device (boom, bucket, and arm) which are installed in a second center bypass passage 22 of the second hydraulic pump 2; and a straight traveling valve 4 installed on an upstream side of the second center bypass passage 22 and shifted to supply a hydraulic fluid fed from the first hydraulic pump 1 to the first and second traveling control valves 9 and 14 and to supply the hydraulic fluid fed from the second hydraulic pump 2 to the control valves 10-13 and 15-17 for the working devices, in response to a pilot signal pressure applied from the pilot pump 3.

Reference numerals 6 and 7a denote check valves, and 7 denotes a fixed orifice.

The left traveling motor 8 and the working device are driven by the hydraulic fluid fed from the first hydraulic pump 1, while the right traveling motor 8a and the working device are driven by the hydraulic fluid fed from the second hydraulic pump 2.

In case that the straight traveling valve 4 is shifted by the pilot signal pressure from the pilot pump 3, a part of the hydraulic fluid fed from the first hydraulic pump 1 is supplied to the first traveling control valve 9 via the first center bypass passage 20. At the same time, a part of the hydraulic fluid fed from the first hydraulic pump 1 is supplied to the second traveling control valve 14 via a passage 21 and the straight traveling valve 4.

Meanwhile, a part of the hydraulic fluid fed from the second hydraulic pump 2 is supplied to the control valves 15-17 for the right working device through a passage 23, and simultaneously, a part of the hydraulic fluid fed from the second hydraulic pump 2 is supplied to the control valves 10-13 for the left working device via the shifted straight traveling valve 4 and a passage 24.

That is, the hydraulic fluid fed from the first hydraulic pump 1 serves to operate the traveling device, and the hydraulic fluid fed from the second hydraulic pump 2 serves to operate the left and right working devices.

With the structure of the conventional hydraulic circuit, the pressure corresponding to the high load of the left working device which is generated in the passage 24 and the pressure corresponding to the high load of the right working device which is generated in the passage 23 are supplied to the second traveling control valve 14 via a fixed orifice 7 and a check valve, when the straight traveling valve 4 is shifted to carry out the combined operation in which the traveling device and the working device are simultaneously driven.

As a result, the left and right traveling pressure is not balanced. This results in a failure in keeping the heavy construction equipment travel straight and thereby creating a left or right declination of the equipment. Also, a shock such as a sudden traveling happens due to the sudden supply of the hydraulic fluid to the traveling device.

In addition, if the traveling side pressure is relatively high while the working side pressure is relatively low, the hydraulic fluid is fed to the working device, so that the traveling is decelerated. This results in reduction of the operability of the traveling device and the working efficiency.

More specifically, in case of burying heavy pipes, such as large waste pipes, under a road in a downtown, the straight traveling valve 4 is shifted, and then the high load working is performed by manipulating operation levers of the first and second traveling control valves 9 and 14 not in a full stroke but in a half stroke (so-called "half lever") and also manipulating operation levers in a half lever.

In this instance, when the operation lever of the control valves 10 to 13 for the left working device and the operation lever of the control valves 15 to 17 for the right working device are manipulated not in a full stroke, but in a half stroke (so-called "half lever"), the first and second center bypass passages 20 and 22 are not fully closed, but opened in half.

As a result, since the hydraulic fluid of the first hydraulic pump 1 serves to operate the traveling device, and the hydraulic fluid of the second hydraulic pump 2 serves to operate the left and right working devices, the roles are not fully shared.

If the first traveling control valve 9 is shifted by a half due to the half lever, the hydraulic fluid fed from the first hydraulic pump 1 is supplied to the center bypass passage of the control valves 10 to 13 for the downstream side working device via the first center bypass passage 20 and the first traveling control valve 9.

In this instance, the pressure applied to the first hydraulic pump 1 is varied depending upon not the pure traveling pressure but the stroke of the control valves 10 to 13 for the downstream working device.

The flow passage of hydraulic fluid which is fed from the first hydraulic pump 1 and then flow through the first center bypass passage 20 and a pressurized tank 18 is interrupted by the spool operation of the control valves 10 to 13 for the downstream working device. As a result, the delivery pressure of the first hydraulic pump 1 is increased, and thus the traveling side pressure applied to the first hydraulic pump 1 is increased.

It is similarly applied to the second traveling control valve 14 and the control valves 15 to 17 for the downstream working device.

Accordingly, as the load pressure generated by the working device is increased, the pressure corresponding to the high load of the working device is transferred to the second traveling control valve 14 via the fixed orifice 7 and the check valve, thereby increase the pressure in the right traveling motor 8a.

As a result, the straight traveling is not ensured dependent of the working device, and the traveling device is supplied with the pressure according to the shift of the control valve for the working device. Therefore, the left and right traveling pressure is not balanced, thereby creating left or right declination or sudden traveling of the equipment and thus reducing the operability of the traveling device.

In addition, if the traveling side pressure is high and the working device side pressure is low, the hydraulic fluid travels to the working device, thereby decreasing the working efficiency.

SUMMARY OF THE INVENTION

Accordingly, the present invention has been made to solve the above-mentioned problems occurring in the prior art while advantages achieved by the prior art are maintained intact.

One object of the present invention is to provide a straight traveling hydraulic circuit, which, in case of performing a combined operation in which a fine operation of a working device and a fine traveling of a traveling device are simultaneously required, can allow heavy construction equipment to operate independent of the working device, thereby preventing a declination or sudden traveling of the equipment, improving the traveling operation, and increasing the working efficiency.

In order to accomplish these objects, there is provided a straight traveling hydraulic circuit, according to the present invention, which includes first and second hydraulic pumps; a first traveling control valve and control valves for a working device which are installed in a first center bypass passage of the first hydraulic pump; a first center bypass shifting valve installed on the lowest downstream side of the first center bypass passage and shifted when a signal pressure is applied from an exterior; a second traveling control valve and control valves for the working device which are installed in a second bypass passage of the second hydraulic pump; a straight traveling valve installed on an upstream side of the second bypass passage and shifted to distribute a hydraulic fluid fed from the first and second hydraulic pumps to the working device and a traveling device in response to a signal pressure applied from the exterior; and a second center bypass shifting valve installed on the lowest downstream of the second center bypass passage and shifted when the signal pressure is applied from the exterior; wherein, in case of performing a combined operation in which the working device and the traveling device are simultaneously required, the first and second center bypass shifting valves are shifted to decrease a degree of opening of the first and second center bypass passages in response to the signal pressure shifting the straight traveling valve, thereby driving the working device and the traveling device independently.

The straight traveling hydraulic circuit according to embodiments of the present invention may further comprise a remote control valve for supplying the pilot signal pressure fed from a pilot pump to the first and second center bypass shifting valves and the straight traveling valve when an operator operates a lever.

In another aspect of the present invention, there is provided a straight traveling hydraulic circuit, which includes first and second hydraulic pumps; a first traveling control valve and control valves for a working device which are installed in a first center bypass passage of the first hydraulic pump; a first center bypass shifting valve installed on the lowest downstream side of the first center bypass passage and shifted when a signal pressure is applied from an exterior; a second traveling control valve and control valves for the working device which are installed in a second bypass passage of the second hydraulic pump; a straight traveling valve installed on an upstream side of the second bypass passage and shifted to distribute a hydraulic fluid fed from the first and second hydraulic pumps to the working device and a traveling device in response to a signal pressure applied from the exterior; a variable orifice disposed in a confluent passage which connects a passage branched from the upstream side of the second center bypass passage with the second center bypass passage in parallel, the orifice being switched in response to the signal pressure applied from the exterior, and interrupting a traveling of the hydraulic fluid from the working device to a traveling side when the signal pressure is applied from the exterior; and a second center bypass shifting valve installed on the lowest downstream of the second center bypass passage and shifted when the signal pressure is applied from the exterior; wherein, in case of performing a combined operation in which the working device and the traveling device are simultaneously required, the variable orifice and the first and second center bypass shifting valves are shifted to decrease a degree of opening of the first and second center bypass passages in response to the signal pressure shifting the straight traveling valve, thereby driving the working device and the traveling device independently.

The straight traveling hydraulic circuit according to embodiments of the present invention may further comprise a remote control valve for supplying the pilot signal pressure fed from a pilot pump to the first and second center bypass shifting valves, the straight traveling valve, and the variable orifice, when an operator operates a lever.

In still another aspect of the present invention, there is provided a straight traveling hydraulic circuit, according to the present invention, which includes first and second hydraulic pumps; a first traveling control valve and control valves for a working device which are installed in a first center bypass passage of the first hydraulic pump; a second traveling control valve and control valves for the working device which are installed in a second bypass passage of the second hydraulic pump; a straight traveling valve installed on an upstream side of the second bypass passage and shifted to distribute a hydraulic fluid fed from the first and second hydraulic pumps to the working device and a traveling device in response to a signal pressure applied from an exterior; and a variable orifice disposed in a confluent passage which is branched from an upstream side of the second center bypass passage to connect the second center bypass passage with a passage connected to the working device in parallel, the orifice being switched in response to signal pressure applied from an exterior, and interrupting a traveling of the hydraulic fluid to a traveling side when a high load is generated in the working device; wherein, in case of performing a combined operation in which the working device and the traveling device are simultaneously required, the variable orifice is switched to decrease a degree of opening of the confluent passage in response to the signal pressure shifting the straight traveling valve, thereby driving the working device and the traveling device independently.

The straight traveling hydraulic circuit may further include a remote control valve for supplying the pilot signal pressure fed from a pilot pump to the straight traveling valve and the variable orifice when an operator operates a lever.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

A straight traveling hydraulic circuit according to the present invention will now be described in detail with reference to preferred embodiments.

Figure 2:
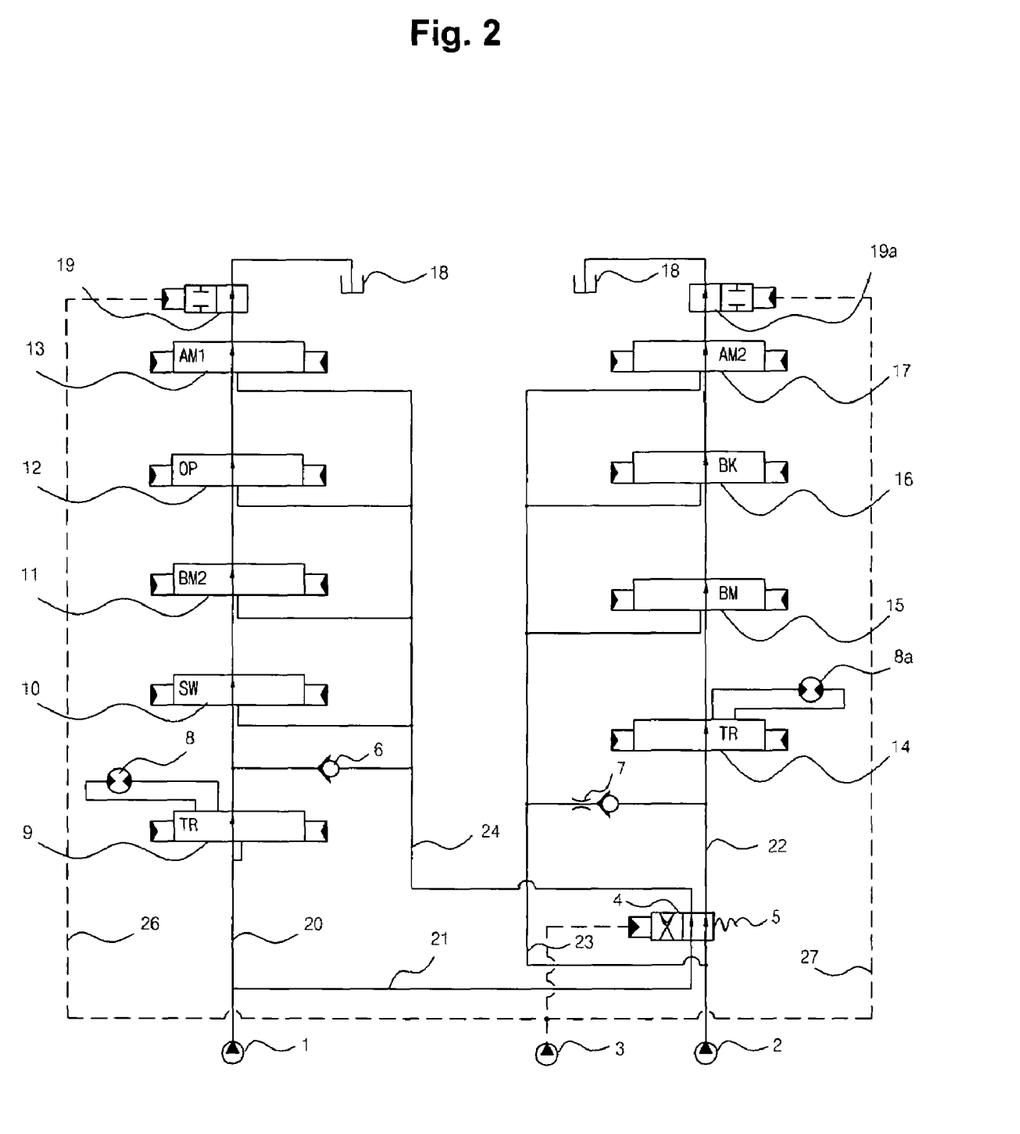
FIG. 2 is a circuit diagram of a straight traveling hydraulic circuit according to an embodiment of the present invention.

Referring to FIG. 2, the straight traveling hydraulic circuit according to an embodiment of the present invention includes first and second hydraulic pumps 1 and 2; a first traveling control valve 9 and control valves 10 to 13 for a working device (swing, boom, option device, and arm) which are installed in a first center bypass passage 20 of the first hydraulic pump 1; a first center bypass shifting valve 19 installed on the lowest downstream side of the first center bypass passage 20 and shifted when a signal pressure is applied from an exterior through a pilot passage 26; a second traveling control valve 14 and control valves 15 to 17 for the working device (boom, bucket, and arm) which are installed in a second center bypass passage 22 of the second hydraulic pump 2; a straight traveling valve 4 installed on an upstream side of the second center bypass passage 22 and shifted to distribute a hydraulic fluid fed from the first and second hydraulic pumps 1 and 2 to the working device and a traveling device in response to signal pressure applied from the exterior through the pilot passage; and a second center bypass shifting valve 19*a* installed on the lowest downstream side of the second center bypass passage 22 and shifted when the signal pressure is applied from the exterior through a pilot passage 27.

In case of performing a combined operation in which the working device and the traveling device are simultaneously required, the first and second center bypass shifting valves 19 and 19*a* are shifted to decrease a degree of opening of the first and second center bypass passages 20 and 22 in response to the signal pressure shifting the straight traveling valve 4, thereby driving the working device and the traveling device independently.

Also, the hydraulic circuit includes a remote control valve (not shown) for supplying a pilot signal pressure fed from a pilot pump 3 to the first and second center bypass shifting valves 19 and 19*a* and the straight traveling valve 4, when an operator operates a lever.

Reference numeral 5 denotes a valve spring, 6 and 7*a* denote check valves, and 7 denotes a fixed orifice.

The operation of the straight traveling hydraulic circuit according to an embodiment of the present invention will now be described with reference to FIG. 2.

As shown in FIG. 2, in case of performing a combined operation (e.g., burying heavy pipes, such as large waste pipes, under a road in a downtown) by simultaneously operating the traveling device and the working device of the heavy construction equipment, the operator operates a remote control valve to apply a pilot signal pressure fed from the pilot pump 3 to the straight traveling valve 4 and thereby shift an internal spool in a right direction (in this instance, the valve spring 5 is compressed) in the drawing.

At the same time, the pilot signal pressure is supplied to the first center bypass shifting valve 19 installed on the lowest downstream side of the first center bypass passage 20 through the pilot passage 26, and shifts the internal spool in a left direction in the drawing.

Accordingly, a part of the hydraulic fluid fed from the first hydraulic pump 1 is supplied to the first traveling control valve 9 for a left traveling motor 8 via the first center bypass passage 20, and simultaneously, a part of the first hydraulic fluid fed from the first hydraulic pump 1 is supplied to the second traveling control valve 14 for a right traveling motor 8*a*, which is disposed in the second center bypass passage 22, via the passage 21 and the shifted straight traveling valve 4.

A part of the hydraulic fluid fed from the second hydraulic pump 2 is supplied to the right working device via the passage 23, and simultaneously, a part of the hydraulic fluid fed from the second hydraulic pump 2 is supplied to the left working device via the shifted straight traveling valve 4 and the passage 24.

Accordingly, if any one of the control valves 10-13 and 15-17 for the working device, which are installed on the downstream side of the first and second traveling control valves 9 and 14, is shifted, the pressure of the hydraulic fluid fed from the first and second hydraulic pumps 1 and 2 to the hydraulic tank 18 through the first and second bypass passages 20 and 22 is formed to correspond to the degree of opening of the first and second center bypass switching valves 19 and 19*a* (i.e., the same pressure is formed in the first and second center bypass passages 20 and 22 without any pressure difference between left and right sides).

Also, even if any one of the first and second traveling control valves 9 and 14, which are installed on the upstream side of the first and second center bypass passages 20 and 22, is shifted, no pressure difference occurs between the hydraulic pressures formed in the first and second center bypass passages 20 and 22.

Accordingly, even in case of performing the combined operation in which a fine operation of the working device and a fine traveling of the traveling device are simultaneously required, no declination of the equipment occurs.

On the other hand, in consideration of the shifting pressure or stroke of the respective working device control valves 10-13 and 15-17, the degree of opening according to the shifting of the first and second center bypass shifting valves 19 and 19a should be relatively lower than the degree of opening formed from the first and second hydraulic pumps 1 and 2 to the first and second center bypass passages 20 and 22.

Figure 3:
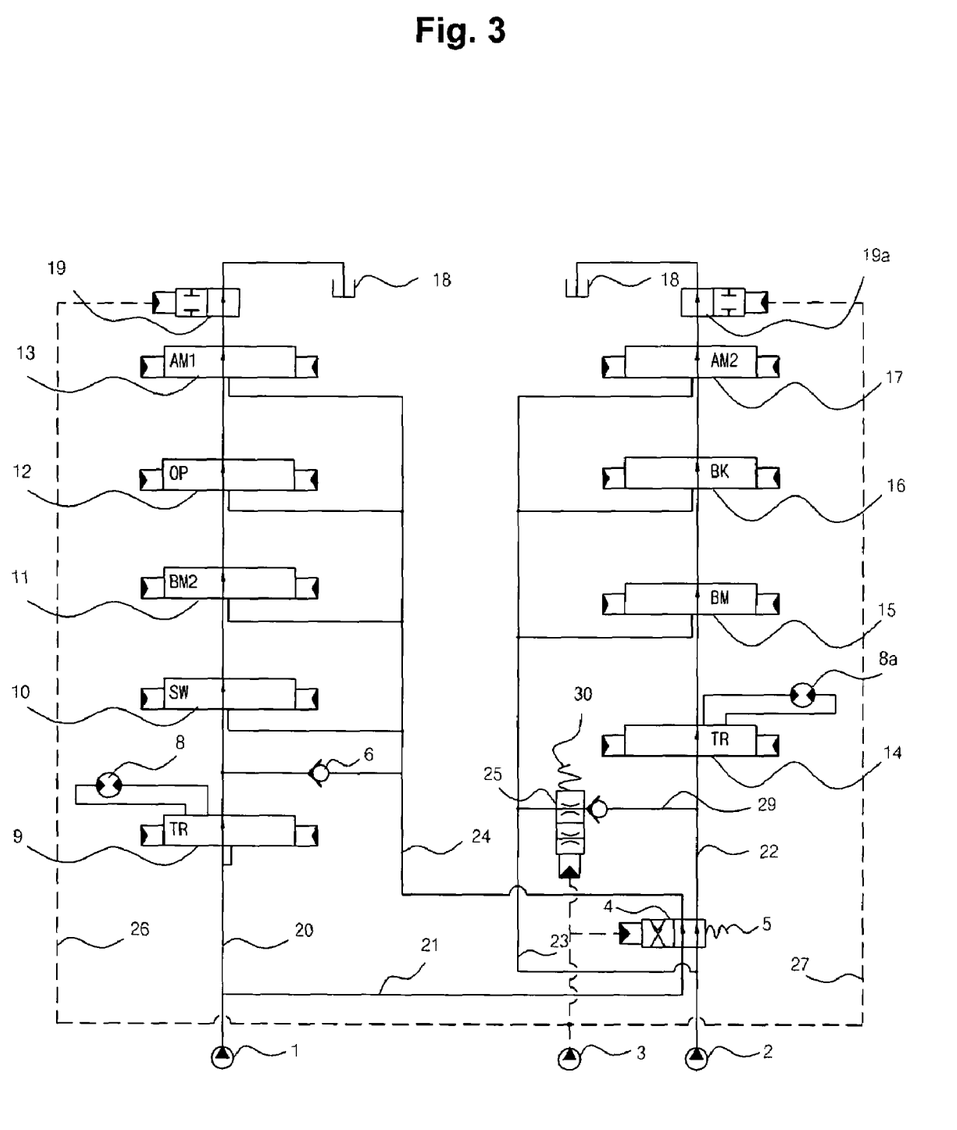
FIG. 3 is a circuit diagram of a straight traveling hydraulic circuit according to another embodiment of the present invention.

As illustrated in FIG. 3, the straight traveling hydraulic circuit according to another embodiment of the present invention includes first and second hydraulic pumps 1 and 2; a first traveling control valve 9 and control valves 10 to 13 for a working device (swing, boom, option device, and arm) which are installed in a first center bypass passage 20 of the first hydraulic pump 1; a first center bypass shifting valve 19 installed on the lowest downstream side of the first center bypass passage 20 and shifted when a signal pressure is applied from an exterior through a pilot passage 26; a second traveling control valve 14 and control valves 15 to 17 for the working device (boom, bucket, and arm) which are installed in a second center bypass passage 22 of the second hydraulic pump 2; a straight traveling valve 4 installed on an upstream side of the second center bypass passage 22 and shifted to distribute a hydraulic fluid fed from the first and second hydraulic pumps 1 and 2 to the working device and a traveling device in response to a signal pressure applied from the exterior; a variable orifice 25 disposed in a confluent passage 29 (i.e., a passage combining a part of a working device side hydraulic fluid with a traveling device side hydraulic fluid) which connects a passage 23 branched from the upstream side of the second center bypass passage 22 with the second center bypass passage 22 in parallel, the orifice 25 being switched in response to the signal pressure applied from the exterior to interrupt the traveling of the hydraulic fluid from the working device to the traveling side; and a second center bypass shifting valve 19a installed on the lowest downstream side of the second center bypass passage 22 and shifted when the signal pressure is applied from the exterior through a pilot passage 27.

In case of performing a combined operation in which the working device and the traveling device are simultaneously required, the variable orifice 25 and the first and second center bypass shifting valves 19 and 19a are shifted to decrease the degree of opening of the first and second center bypass passages 20 and 22 in response to the signal pressure shifting the straight traveling valve 4, thereby driving the working device and the traveling device independently.

Also, the hydraulic circuit includes a remote control valve (not shown) for supplying a pilot signal pressure fed from a pilot pump 3 to the first and second center bypass shifting valves 19 and 19a, the variable orifice 25, and the straight traveling valve 4, when an operator operates a lever.

Reference numerals 5 and 30 denote valve springs, and 6 and 7a denote check valves.

The operation of the straight traveling hydraulic circuit according to another embodiment of the present invention will now be described with reference to FIG. 3. Since the construction of the straight traveling hydraulic circuit according to another embodiment of the present invention is substantially equal to that as illustrated in FIG. 2 except for the variable orifice 25 that is disposed in the confluent passage 29 and is switched by the pilot signal pressure shifting the straight traveling valve 4 and the first and second center bypass shifting valves 19 and 19a, the detailed description thereof will be omitted.

In case of performing the combined operation by simultaneously operating the traveling device and the working device of the heavy construction equipment, the operator operates the remote control lever to apply the pilot signal pressure fed from the pilot pump 3 to the straight traveling valve 4, and thereby shift the internal spool in a right direction (in this instance, the valve spring 5 is compressed) in the drawing.

At the same time, the pilot signal pressure is supplied to shift the first and second center bypass shifting valves 19 and 19a installed on the lowest downstream side of the first and second center bypass passages 20 and 22 through the pilot passages 26 and 27. The pilot signal pressure also shifts the variable orifice 25 in an upward direction (in this instance, the valve spring 30 is compressed) in the drawing.

The cross section of the orifice 25 is shifted to a full close state due to the switching of the variable orifice 25. That is, the pressure of the hydraulic fluid fed from the first and second hydraulic pumps 1 and 2 to the hydraulic tank 18 through the first and second bypass passages 20 and 22 is formed to correspond to the degree of opening of the first and second center bypass switching valves 19 and 19a. Thus, no pressure difference occurs between the hydraulic pressures formed in the first and second center bypass passages 20 and 22.

Since the confluent passage 29 is almost closed by the variable orifice 25 although the high pressure of the highly loaded working device such as a boom is formed in the passage 23, the high pressure of the working device hardly affects the traveling of the equipment.

On the other hand, when the variable orifice 25 is in a neutral mode, no pressure loss occurs since the set cross section of the orifice is ensured. Thus, if the high load is generated in the working device, the hydraulic fluid generated in the passage 23 is supplied to the second traveling control valve 14.

Accordingly, even in case of performing the combined operation by simultaneously traveling the heavy construction equipment and operating the working device, the declination or sudden traveling of the equipment does not occur, thereby improving its manipulation due to a stable traveling.

Figure 4:
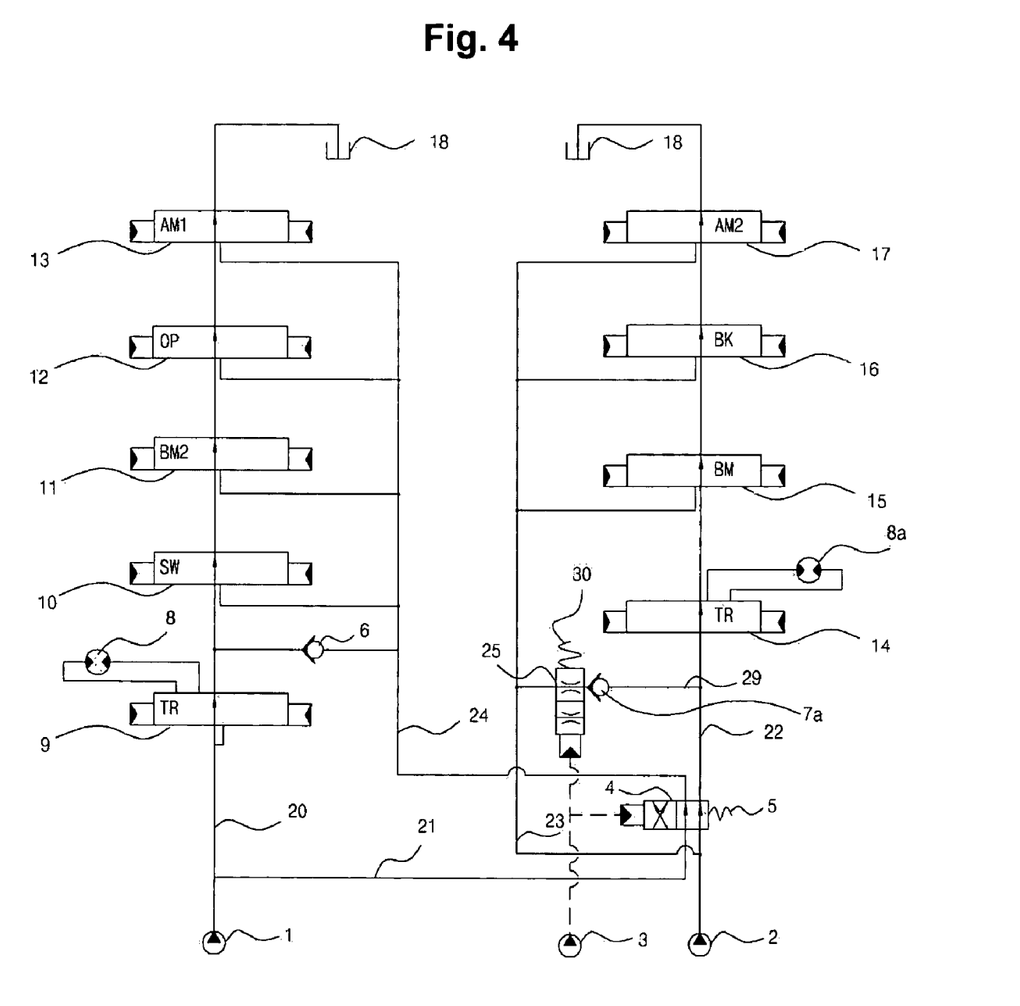
FIG. 4 is a circuit diagram of a straight traveling hydraulic circuit according to still another embodiment of the present invention.

As illustrated in FIG. 4, the straight traveling hydraulic circuit according to still another embodiment of the present invention includes first and second hydraulic pumps 1 and 2; a first traveling control valve 9 and control valves 10 to 13 for a working device (swing, boom, option device, and arm) which are installed in a first center bypass passage 20 of the first hydraulic pump 1; a second traveling control valve 14 and control valves 15 to 17 for the working device (boom, bucket, and arm) which are installed in a second bypass passage 22 of the second hydraulic pump 2; a straight traveling valve 4 installed on an upstream side of the second bypass passage 22 and shifted to distribute a hydraulic fluid fed from the first and second hydraulic pumps 1 and 2 to the working device and a traveling device in response to signal pressure applied from an exterior; and a variable orifice 25 disposed in a confluent passage 29 which is branched from an upstream side of the second center bypass passage 22 to connect the second center bypass passage 22 with a passage 23 connected to the working device in parallel, the orifice 25 being switched in response to signal pressure applied from an exterior, and interrupting a traveling of the hydraulic fluid to a traveling side when a high load is generated in the working device.

In case of performing a combined operation in which the working device and the traveling device are simultaneously required, the variable orifice 25 is switched to decrease a degree of opening of the confluent passage 29, in response to the signal pressure shifting the straight traveling valve 4, thereby driving the working device and the traveling device independently.

Also, the hydraulic circuit includes a remote control valve for supplying pilot signal pressure fed from a pilot pump 3 to the straight traveling valve 4 and the variable orifice 25, when an operator operates a lever.

The operation of the straight traveling hydraulic circuit according to still another embodiment of the present invention will now be described with reference to FIG. 4. Since the construction of the straight traveling hydraulic circuit according to another embodiment of the present invention is substantially equal to that as illustrated in FIG. 3 except for the straight traveling valve 4 and the variable orifice 25 that is disposed in the confluent passage 29 and is switched by the pilot signal pressure shifting the straight traveling valve 4 during the combined operation, the detailed description thereof will be omitted.

In case of performing a combined operation by simultaneously operating the traveling device and the working device of the heavy construction equipment, the operator operates the remote control valve to apply the pilot signal pressure (indicated by an imaginary line) fed from the pilot pump 3 to the straight traveling valve 4 and thereby shift an internal spool in a right direction (in this instance, the valve spring 5 is compressed) in the drawing. At the same time, the pilot signal pressure switches the variable orifice 25 upwardly (in this instance, the valve spring 30 is compressed).

Consequently, a part of the hydraulic fluid fed from the first hydraulic pump 1 is supplied to the first traveling control valve 9 for a left traveling motor 8 via the first center bypass passage 20, and simultaneously, a part of the first hydraulic fluid fed from the first hydraulic pump 1 is supplied to the second traveling control valve 14 for a right traveling motor 8a, which is disposed in the second center bypass passage 22, via the passage 21 and the shifted straight traveling valve 4.

A part of the hydraulic fluid fed from the second hydraulic pump 2 is supplied to the right working device via the passage 23, and simultaneously, a part of the hydraulic fluid fed from the second hydraulic pump 2 is supplied to the left working device via the shifted straight traveling valve 4 and the passage 24.

If the high load is applied to the working device, such as a boom, an arm, a bucket, upon operation, high pressure is generated in the passage 23 connected to the control valves 15 to 17 for the working device which are installed on the downstream side of the second center bypass passage 22.

At that time, the cross section of the orifice 25 which is disposed in the confluent passage 29 is switched into a mode close to a full close state (a diameter of the orifice is so decreased as to close the confluent passage 29).

Since the confluent passage 29 is almost closed by the variable orifice 25, the high pressure of the working device hardly affects the traveling of the equipment, in case that the high pressure of the highly loaded working device such as a boom is formed in the passage 23.

That is, when the high load is generated in the working device, it can minimize the declination or sudden traveling of the equipment due to the pressure difference between left and right traveling side hydraulic pressure.

When the variable orifice is in a neutral mode, the pressure loss does not happen since the set cross section of the orifice is ensured. Thus, if the high load is generated in the working device, the hydraulic fluid of high pressure generated in the passage 23 is supplied to the second traveling control valve 14 via the variable orifice 25.

In case of performing the combined operation in which a fine operation of the working device and a fine traveling of the traveling device are simultaneously required, the declination or sudden traveling of the equipment does not happen, thereby improving its manipulation due to a stable traveling.

With the above description, in case of performing the combined operation in which the half lever of the traveling control valve and the fine operation of the working device such as a boom or bucket are simultaneously required, the equipment can travel independent of the working device, thereby preventing the declination or sudden traveling of the equipment, improving the traveling operation, and improving the working efficiency.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A straight traveling hydraulic circuit comprising:
   first and second hydraulic pumps;
   a first traveling control valve and control valves for a working device which are installed in a first center bypass passage of the first hydraulic pump;
   a first center bypass shifting valve installed on the lowest downstream side of the first center bypass passage and shifted when a signal pressure is applied from an exterior;
   a second traveling control valve and control valves for the working device which are installed in a second bypass passage of the second hydraulic pump;
   a straight traveling valve installed on an upstream side of the second bypass passage and shifted to distribute a hydraulic fluid fed from the first and second hydraulic pumps to the working device and a traveling device in response to a signal pressure applied from the exterior;
   a variable orifice disposed in a confluent passage which connects a passage branched from the upstream side of the second center bypass passage with the second center bypass passage in parallel, the orifice being switched in response to the signal pressure applied from the exterior, and interrupting a traveling of the hydraulic fluid from the working device to a traveling side when the signal pressure is applied from the exterior; and
   a second center bypass shifting valve installed on the lowest downstream of the second center bypass passage and shifted when the signal pressure is applied from the exterior;
   wherein, in case of performing a combined operation in which the working device and the traveling device are simultaneously required, the variable orifice and the first and second center bypass shifting valves are shifted to decrease a degree of opening of the first and second center bypass passages in response to the signal pressure shifting the straight traveling valve, thereby driving the working device and the traveling device independently.

2. The straight traveling hydraulic circuit of claim 1, further comprising a remote control valve for supplying a pilot signal pressure fed from a pilot pump to the first and second center bypass shifting valves, the straight traveling valve and the variable orifice when an operator operates a lever.

3. A straight traveling hydraulic circuit comprising:
   first and second hydraulic pumps;
   a first traveling control valve and control valves for a working device which are installed in a first center bypass passage of the first hydraulic pump;
   a second traveling control valve and control valves for the working device which are installed in a second bypass passage of the second hydraulic pump;
   a straight traveling valve installed on an upstream side of the second bypass passage and shifted to distribute a hydraulic fluid fed from the first and second hydraulic pumps to the working device and a traveling device in response to a pilot signal pressure applied from an exterior; and a variable orifice disposed in a confluent passage which is branched from an upstream side of the second center bypass passage to connect the second center bypass passage with a passage connected to the working device in parallel, the orifice being switched in response to the pilot signal pressure applied from the exterior, and interrupting a traveling of the hydraulic fluid to a traveling side when a high load is generated in the working device;

wherein, in case of performing a combined operation in which the working device and the traveling device are simultaneously required, the variable orifice is switched to decrease a degree of opening of the confluent passage in response to the signal pressure shifting the straight traveling valve, thereby driving the working device and the traveling device independently.

4. The straight traveling hydraulic circuit as claimed in claim 3, further comprising a remote control valve for supplying pilot signal pressure fed from a pilot pump to the straight traveling valve and the variable orifice, when an operator operates a lever.

* * * * *